(12) United States Patent
Cocchi et al.

(10) Patent No.: US 10,251,410 B2
(45) Date of Patent: Apr. 9, 2019

(54) THERMODYNAMIC SYSTEM FOR THERMAL TREATMENT AND MACHINE COMPRISING THE SYSTEM, FOR MAKING LIQUID AND SEMI-LIQUID PRODUCTS

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernuscosul (IT)

( * ) Notice: Subject to any disclaimer, the term of this patent is extended or adjusted under 35 U.S.C. 154(b) by 53 days.

(21) Appl. No.: 15/295,616

(22) Filed: Oct. 17, 2016

(65) Prior Publication Data

US 2017/0105427 A1  Apr. 20, 2017

(30) Foreign Application Priority Data

Oct. 19, 2015 (IT) .................... 102015000063040

(51) Int. Cl.
  *F25B 13/00* (2006.01)
  *A23G 9/12* (2006.01)
  (Continued)

(52) U.S. Cl.
  CPC ............ *A23G 9/12* (2013.01); *F25B 13/00* (2013.01); *F25B 40/00* (2013.01); *F25B 41/04* (2013.01);
  (Continued)

(58) Field of Classification Search
  CPC .... A23G 9/12; A23G 9/20; F25B 1/00; F25B 13/00; F25B 40/00; F25B 41/04; F25B 2400/16; F25B 2600/2509
  (Continued)

(56) References Cited

U.S. PATENT DOCUMENTS

2016/0128353 A1* 5/2016 Cocchi .................. A23G 9/22
                                                      99/467

FOREIGN PATENT DOCUMENTS

| EP | 1647783 | 4/2006 |
| EP | 2759214 | 7/2014 |

(Continued)

OTHER PUBLICATIONS

Italian Search Report dated Aug. 3, 2016 from counterpart Italian App No. 102015000063040.

*Primary Examiner* — Melvin Jones
(74) *Attorney, Agent, or Firm* — Shuttleworth & Ingersoll, PLC; Timothy J. Klima

(57) ABSTRACT

A thermodynamic system for a container containing food products of the liquid and/or semi-liquid type includes a circuit including a compressor, a condenser, an expansion element, an evaporator and heat exchanger fluid. An exchanger includes a delivery duct and a return duct, the delivery duct connected on a first side to a condenser outlet to receive the fluid, and connected on the other side to the expansion element to release the fluid to the expansion element. The return duct is connected, on a first side, to a condenser inlet. A recirculation duct is connected to the second side of the delivery duct to receive the fluid, and to a second side of the return duct, opposite the first side, to release the fluid to the return duct. A further expansion element is positioned in the recirculation duct to allow the fluid circulating in the recirculation duct to expand.

10 Claims, 5 Drawing Sheets

(51) Int. Cl.
*F25B 40/00* (2006.01)
*F25B 41/04* (2006.01)

(52) U.S. Cl.
CPC ....... *F25B 2400/13* (2013.01); *F25B 2400/16* (2013.01); *F25B 2600/2509* (2013.01)

(58) Field of Classification Search
USPC .................................................. 62/342, 498
See application file for complete search history.

(56) References Cited

FOREIGN PATENT DOCUMENTS

| | | |
|---|---|---|
| FR | 2233577 | 1/1975 |
| GB | 1423123 | 1/1976 |
| JP | 2011179689 | 9/2011 |
| WO | WO2011105270 | 9/2011 |

\* cited by examiner

THERMODYNAMIC SYSTEM FOR THERMAL TREATMENT AND MACHINE COMPRISING THE SYSTEM, FOR MAKING LIQUID AND SEMI-LIQUID PRODUCTS

This application claims priority to Italian Patent Application 102015000063040 filed Oct. 19, 2015, the entirety of which is incorporated by reference herein.

BACKGROUND OF THE INVENTION

This invention relates to a thermodynamic system for thermal treatment and to a machine comprising the system, for making liquid and semi-liquid products.

In the sector of machines for making liquid and semi-liquid products such as ice creams, cake and pastry fillings and the like, it is standard practice to thermally treat a product (by heating and/or cooling) in order to make a predetermined recipe.

Known in the prior art is a plurality of thermal systems of thermodynamic type which allow a product to be thermally treated in a container in order to modify its food qualities.

Most thermodynamic systems for cooling are based on the inverse Carnot cycle ("saturated vapor compression"): these systems allow a container to be cooled by means of a thermodynamic circuit operating on a heat exchanger fluid and comprising a pair of exchangers (evaporator and condenser), a compressor and a laminar flow element, with the heat exchanger fluid flowing through all of them.

FIG. 2 illustrates a thermal treatment system of known type based on the inverse Carnot cycle and comprising a suction line heat exchanger.

Generally speaking, the refrigerating cycle with the liquid-suction exchanger is particularly efficient.

Further, a thermodynamic system with a liquid-suction exchanger allows undercooling the refrigerant liquid flowing out of the condenser in order to prevent the formation of vapor bubbles (or "flash gas") in the liquid upstream of the expansion element (which would cause noise and rapid wear of the system).

A thermodynamic system with a liquid-suction exchanger also allows overheating any residual liquid (causing it to evaporate completely) inside the suction line upstream of the compressor which would otherwise lead to rapid wear of the compressor components if it were to find its way into the compressor.

Evident from the above are the advantages of a thermodynamic system with a liquid-suction exchanger. This type of system is thus particularly suitable for machines for making liquid or semi-liquid products, which must be highly reliable and low noise in operation.

A growing need felt by machine manufacturers is that of having a thermodynamic system adapted to thermally treat very small quantities of ingredients (for example, single serve machines) where the amounts of heat exchanged through the heat exchangers are particularly small.

In particular, in the ice cream sector, experimental studies conducted by the applicant have shown that existing thermodynamic systems are unable to operate efficiently and stably when the amounts of heat that need to be exchanged are very small.

It should also be stressed that in single serve ice cream machines, ice cream production times are particularly short (in the order of a few minutes).

Ice cream processing requires a particularly stable thermal system operating according to predetermined theoretical mixture cooling profiles, failing which the end product is inevitably poorer in quality.

In this context, in order to make an ice cream of optimal quality, it is essential to control very precisely the temperature of the basic mixture being processed.

Consequently, a need which is particularly strongly felt by machine manufacturers is that of having a refrigeration system whose operation is particularly stable and which is easy to control, even for very small heat requirements, that is to say, for small volumes of basic mixture.

SUMMARY OF THE INVENTION

The aim of this invention, therefore, is to meet the above mentioned need by providing a machine for making liquid and/or semi-liquid products and which allows making both hot liquid products and liquid and/or semi-liquid ice cream products, even in extremely small quantities.

A further aim of the invention is to provide a machine for making liquid and/or semi-liquid products, which allows making both hot liquid products and liquid and/or semi-liquid ice cream products and which is particularly easy to use.

A yet further aim of the invention is to provide a machine for making liquid and/or semi-liquid products, which allows making both hot liquid products and liquid and/or semi-liquid ice cream products and which is particularly easy to clean and maintain.

According to the invention, this aim is achieved by a system and a machine equipped with that system, for making liquid or semi-liquid products and comprising the technical features set out in one or more of the appended claims.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a preferred, non-limiting example embodiment of the invention, and in which:

DESCRIPTION OF THE PREFERRED EMBODIMENTS

Figure 1:
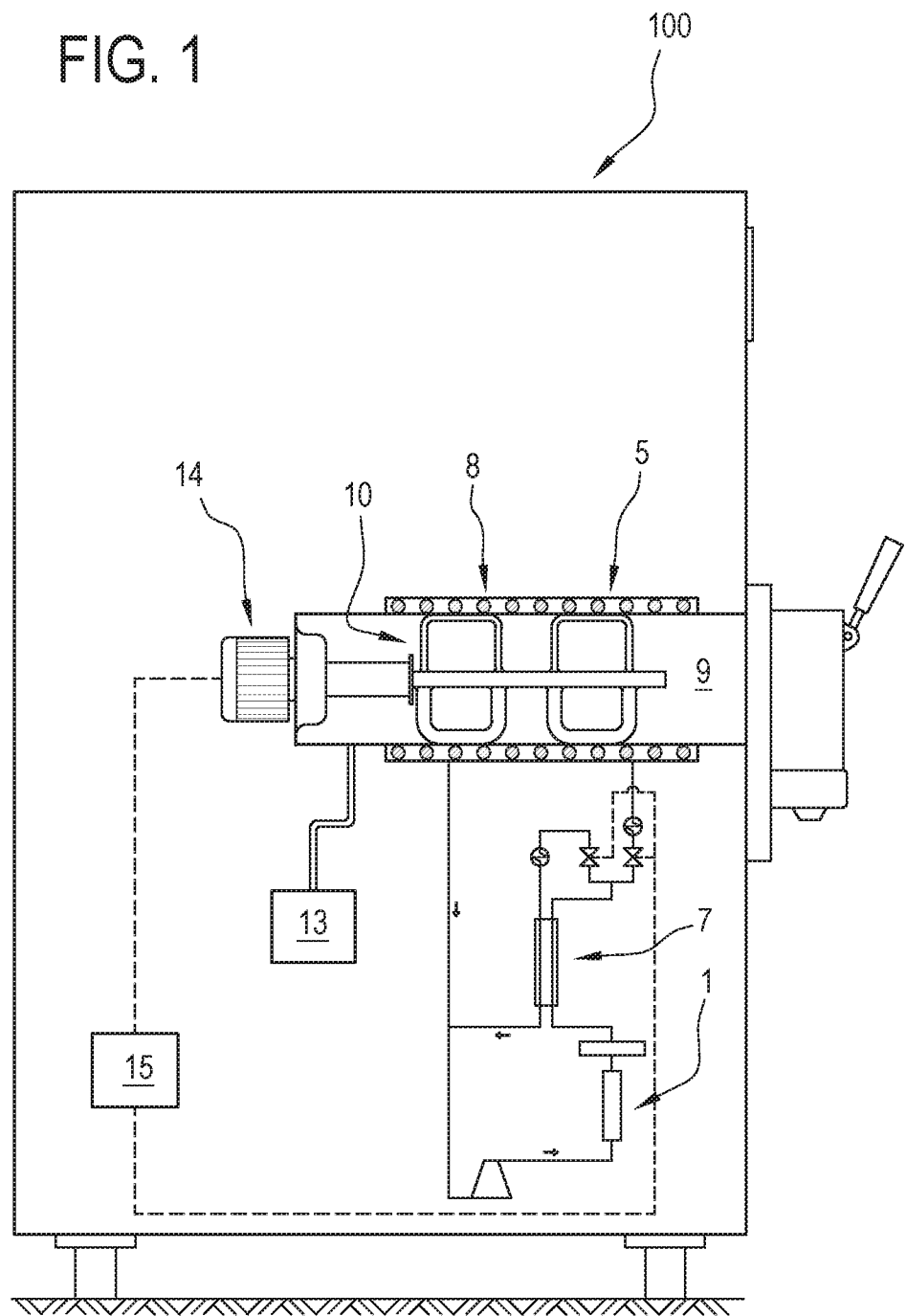
FIG. 1 is a schematic view showing a machine for making liquid and/or semi-liquid products comprising the thermodynamic system of this invention, illustrated in FIG. 3.
Figure 2:
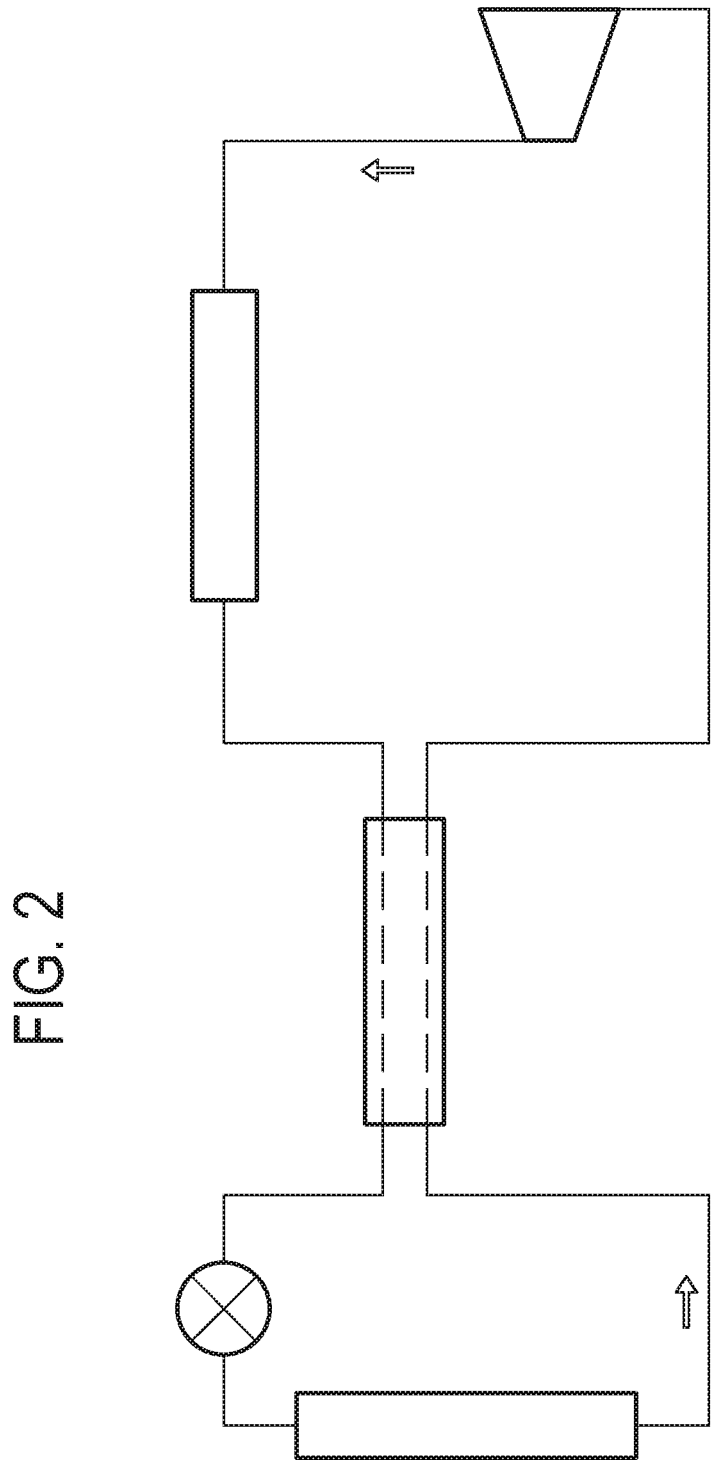
FIG. 2 shows a schematic view of a thermodynamic system with a liquid-suction exchanger of known type.

With reference to the accompanying drawings, the numeral 100 denotes a machine for making liquid and/or semi-liquid products and the numeral 1, a thermodynamic system which can be associated with the machine 100, both forming the object of this invention.

Preferably, the machine 100 is a gelato machine or a soft ice cream machine or a machine for making water ices ("slush").

Defined according to the invention is a thermodynamic system 1 for cooling and/or heating a container 9 containing food product.

Preferably, the container 9 is cylindrical in shape (with horizontal or vertical axis).

Preferably, the container 9 is between 50 and 100 mm in diameter.

Still more preferably, the container 9 is between 80 and 250 mm in (axial) length.

Preferably, the container 9 is between 157,000 mm3 and 1,962,500 mm3 in volume.

It should be noted that the machine 100 is preferably adapted to treat a single portion of product.

Preferably, la machine 100 is a gelato machine.

Preferably, the container 9 is adapted to contain a quantity of mixture of between 50 and 300 g (defining a single portion of product).

The thermodynamic system 1 comprises a circuit having a heat exchanger fluid flowing through it and comprising:

a compressor 3 equipped with an inlet 3A and an outlet 3B;

a condenser 4, positioned at the outlet of the compressor 3;

at least one expansion element 6, (preferably in the form of a capillary) positioned downstream of the condenser 4 to allow the heat exchanger fluid to expand;

an evaporator 5 associated with the container 9 and positioned downstream of the at least one expansion element 6;

a liquid-suction exchanger 7 (known as "suction line heat exchanger").

The liquid-suction exchanger 7 has a delivery duct 7A and a return duct 7B for the heat exchanger fluid, the delivery duct 7A being connected on a first side 7A' (that is, at a first end) to an outlet of the condenser 4 to receive the heat exchanger fluid from the condenser 4, and on the other side 7A" (that is, at a second end), to the at least one expansion element 6 to release the undercooled heat exchanger fluid to the expansion element 6, and the return duct 7B being connected, on a first side 7B' (that is, at a first end 7B'), to the inlet 3A of the compressor 3.

According to the invention, the system 1 also comprises a recirculation duct 18 which can be connected (at a first end of it) to the second side 7A" (that is, the second end) of the delivery duct 7A to receive the (undercooled) heat exchanger fluid, and to a second side 7B" of the return duct 7B (the second side 7B" being opposite to the first side 7B'), to release heat exchanger fluid (at the inlet) to the return duct 7B.

The system 1 also comprises a further expansion element 19 (preferably in capillary form) positioned in the recirculation duct 18 to allow the heat exchanger fluid circulating in the recirculation duct 18 to expand.

It should be noted that the expression "liquid-suction exchanger" 7 is used to mean an exchanger of the type known as "suction line heat exchanger".

The exchanger 7 is configured to allow heat exchange between the delivery duct 7A and the return duct 7B.

More specifically, the delivery duct 7A has flowing through it heat exchanger fluid in the form of (undercooled) liquid, while the return duct 7B has flowing through it heat exchanger fluid in the form of (overheated) vapor.

It should be noted that in the liquid-suction exchanger 7, heat is substantially transferred from the heat exchanger fluid circulating in the delivery duct 7A to the heat exchanger fluid circulating in the return duct 7B, so as to undercool the heat exchanger fluid circulating in the delivery duct 7A and to overheat the heat exchanger fluid circulating in the return duct 7B.

Thus, inside the liquid-suction exchanger 7, the fluid circulating in the delivery duct 7A transfers thermal energy in the form of heat to the heat exchanger fluid circulating in the return duct 7B.

According to another aspect, the system 1 comprises a drive and control unit 15 (of electronic type).

According to another aspect, the system 1 comprises a valve 12 positioned in the recirculation duct 18 and connected to the drive and control unit 15 to be adjusted in such a way as to regulate the flow of heat exchanger fluid circulating in the recirculation duct 18.

More precisely, the valve 12 is connected to the drive and control unit 15 so that it can be turned on or off to open or close the recirculation duct 18 (partly or completely).

Preferably, the valve 12 is connected to the drive and control unit 15 so that it can be turned on or off to open or close the recirculation duct 18 completely.

According to another aspect, the system 1 comprises a valve 11 positioned to regulate the flow of heat exchanger fluid in a portion of the circuit affected by the at least one expansion element 6 and evaporator 5, in such a way as to regulate the flow of heat exchanger fluid in the branch affected by the at least one expansion element 6 and evaporator 5.

According to another aspect, the circuit comprises a storage tank 16 configured to store a portion of the heat exchanger fluid (present inside the circuit itself).

Preferably, the storage tank 16 is interposed between the condenser 4 and the exchanger 7.

Figure 4:
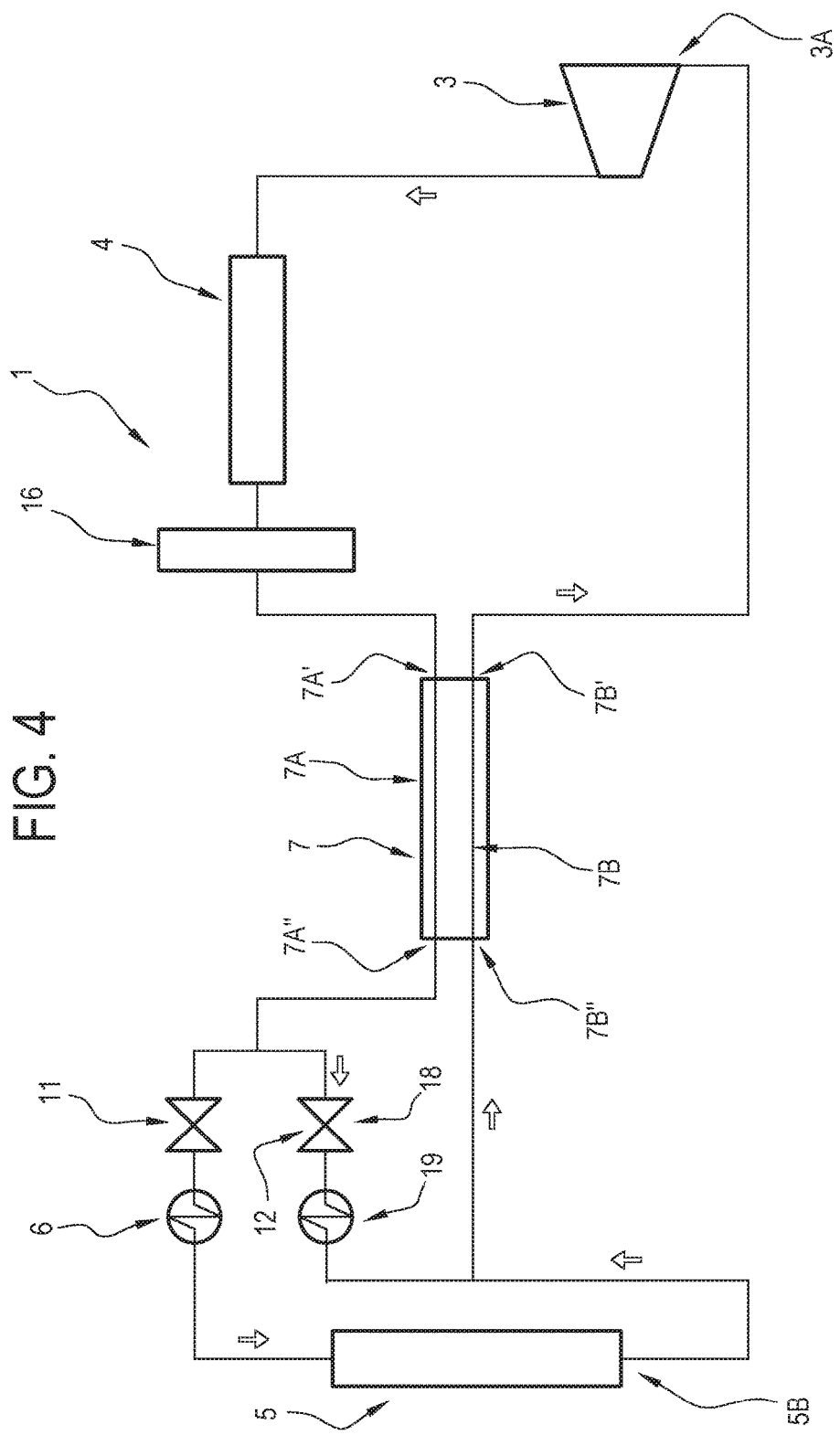
FIG. 4 shows a second embodiment of the thermodynamic system of the invention.

According to another aspect (embodiment illustrated in FIG. 4), an outlet 5B of the evaporator 5 is connected to the recirculation circuit 18, downstream of the further expansion element 19.

According to this aspect, the outlet 5B of the evaporator 5 is connected to a second side 7B" of the return duct 7B, opposite to the first side 7B', to release heat exchanger fluid (at the inlet) to the return duct 7B.

Figure 3:
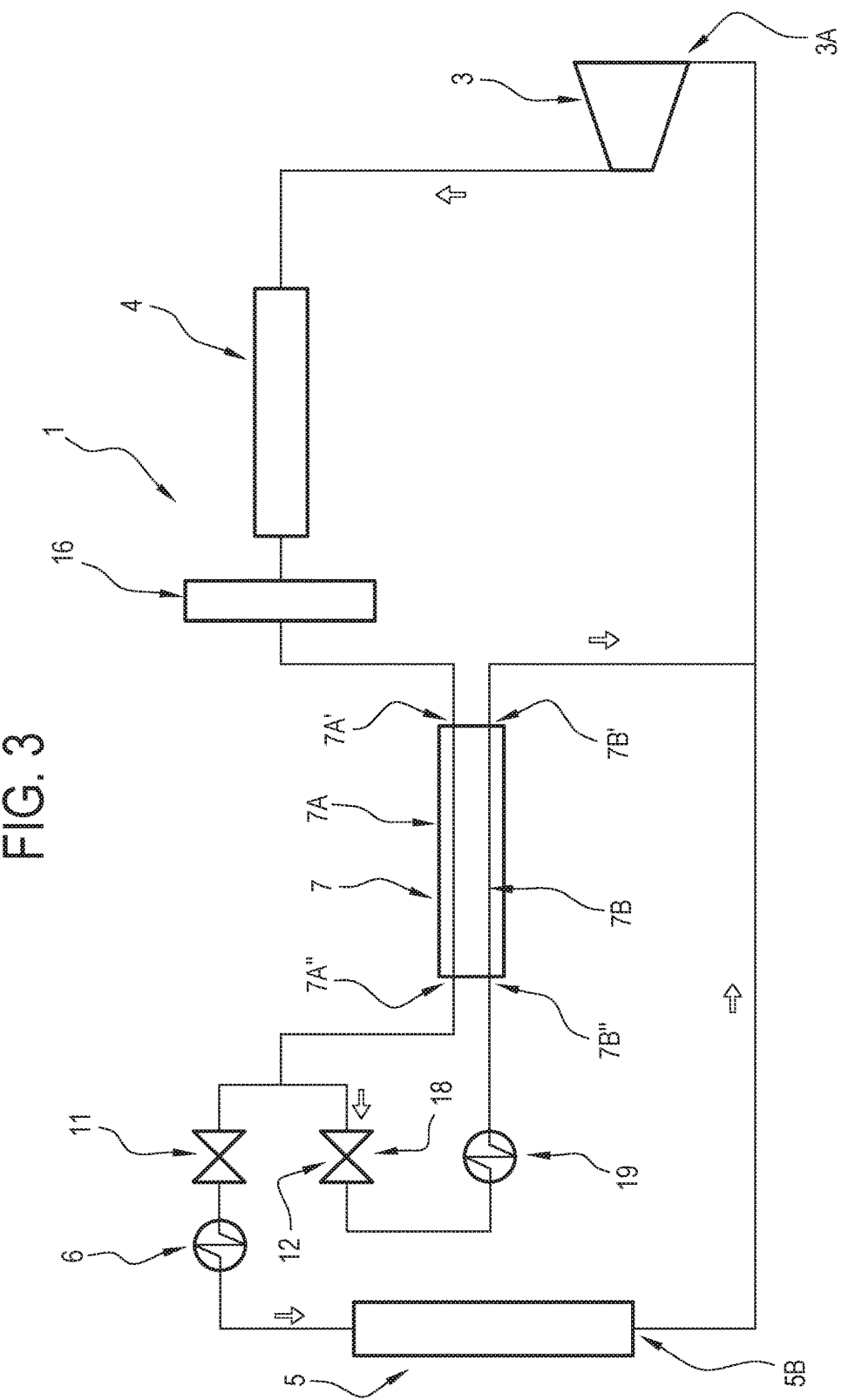
FIG. 3 shows a first embodiment of the thermodynamic system of the invention.

According to another aspect (illustrated in FIG. 3), the outlet 5B of the evaporator 5 is connected to the inlet 3A of the compressor 3.

According to the latter aspect, the first side 7B' of the return duct 7B is connected to the outlet 5B of the evaporator 5.

According to another aspect, the circuit allows implementing a reversible cooling cycle, for cooling or heating the container 9.

Preferably, the heat exchanger fluid is R404-A (but nothing excludes the possibility of using a different type of heat exchanger fluid).

Also defined according to the invention is a machine 100 for making liquid and/or semi-liquid food products, characterized in that it comprises, in combination:

a processing unit 8 for making a liquid and/or semi-liquid product (preferably a cold product), comprising a processing container 9 and a stirrer 10 mounted inside the container 9 to stir and mix the basic mixture inside the container 9, a thermal treatment system 1 as described in the foregoing, associated with the processing unit 8.

The evaporator 5 is associated with the container 9 to exchange thermal energy in the form of heat with the product, that is, the basic mixture inside the processing container 9.

Preferably, the unit 8 is a unit for processing ice cream products.

Still more preferably, the unit 8 is a mixing and cooling unit 8 especially designed to process ice cream type products (traditional gelato, soft ice cream, etc.).

Still more preferably, the unit 8 is configured to allow processing a single portion of product.

Preferably, therefore, the container 9 is configured to contain less than 500 g of material.

It should be noted that the evaporator 5 is preferably in the form of a coil wound around the inside or the outside of the walls of the container 9.

Preferably, the machine 1 comprises a brushless motor 14 operatively coupled to the stirrer 10 to drive the stirrer 10 in rotation.

According to another aspect, the machine comprises a device 13 (illustrated schematically) for cleaning the processing unit 8.

The cleaning device 13 preferably comprises a container for the cleaning water (or the sanitizing fluid, detergent fluid, etc.).

Alternatively, the cleaning device 13 comprises means for connecting it to the water mains.

Preferably, the cleaning device 13 comprises a water heating device adapted to produce (saturated) steam.

The cleaning device 13 also preferably comprises a circuit (equipped with pumps and/or valves) capable of conveying water and/or steam in the machine 1 (in particular in the processing unit 8 (and more specifically, in the container 9).

Cleaning the machine 100 substantially comprises the following steps:

a first step of flushing with hot water with the pump in operation (in order to specifically clean the pump);

a second step of flushing with the pump stopped;

a third step of sanitizing with steam.

These steps can be repeated as necessary in the order specified above or in any other order.

The cleaning device 13 allows performing a "cleaning in place" procedure, that is to say, cleaning the processing unit 8 and/or other components without dismantling them.

With reference to the operation of the system, attention is drawn to the following.

It should be noted that since the machine 100 is adapted to thermally treat small quantities of product (single servings) in extremely short spaces of time, it is advantageously equipped with a system 1 which allows the temperature for treating the product to be reached very quickly after the process starts.

The valves 11 and 12 can be respectively closed or opened as a function of the step and/or state of the process.

In one embodiment, before processing starts, the valve 11 is closed and the valve 12 open. That way, the thermodynamic system 1 may be kept in operation and the heat exchanger fluid circulates in the system through the recirculation circuit 18 (the return branch 7B constitutes the "cold source" of the thermal machine).

Once the basic mixture has been loaded into the container 9, the valve 11 is opened so that the fluid can flow into the evaporator 5.

It should be noted that the fluid which flows into the evaporator 5, is immediately in the right thermodynamic condition to process the product and, in particular, is at the required, optimum temperature for processing the product.

It is obvious, therefore, that even in the earliest moments of the process, the basic mixture inside the container 9 is at the optimum processing temperature.

That means the basic mixture is subjected to the required temperature profile at the earliest moments of the process, allowing an end product of excellent quality to be made.

During processing, the valve 12 may be kept open (totally or partly) or closed.

By opening or closing the valve 12 and/or the valve 11, the system 1 of the invention allows regulating very precisely and accurately the inlet temperature to the exchanger 5. That way, it is very quick and easy to control the temperature profile of the heat exchanger fluid in the evaporator 5 (which influences the temperature of the basic mixture being processed).

It should be noted that if the valve 12 is kept open, a portion of the fluid flowing out of the delivery duct 7A passes through the laminar flow valve 12 and into the return duct 7B.

As pointed out above, the thermodynamic system 1 of the invention is particularly suitable for treating small quantities of product.

In particular, the thermodynamic system 1 advantageously allows:

supplying the evaporator 5 at a constant rate and continuously;

regulating the undercooling of the heat exchanger fluid upstream of the expansion element 6;

regulating the overheating of the heat exchanger fluid upstream of the compressor 3.

It should also be noted that the performance of the system 1 of the invention is particularly high in terms of efficiency.

The machine 100 equipped with the thermodynamic system 1 is therefore particularly well suited to process small quantities, in particular where each quantity constitutes a single serving (less than 500 g).

In effect, it should be noted that the system advantageously allows regulating the temperature of the heat exchanger fluid circulating in the exchanger 7 so that when it is necessary to supply/cool the container 9, the heat exchanger fluid flowing into evaporator 5 is in optimum thermodynamic conditions for maximizing performance and, above all, for minimizing cycle times.

The system 1 can advantageously be used in the single-serve machine 100 which must perform very short, alternate/frequent cycles, such as, for example a. mixing and cooling cycle (duration 40-80 sec);

b. cleaning cycle (duration 50 sec);

c. mixing and cooling cycle (duration 40-80 sec);

d. cleaning cycle (duration 50 sec).

It should be noted that the fluid circulating in the duct 18 acts as a secondary fluid for the system 1, which allows regulating in a particularly precise and reliable manner the temperature of the heat exchanger fluid flowing into the evaporator 5.

Figure 5:
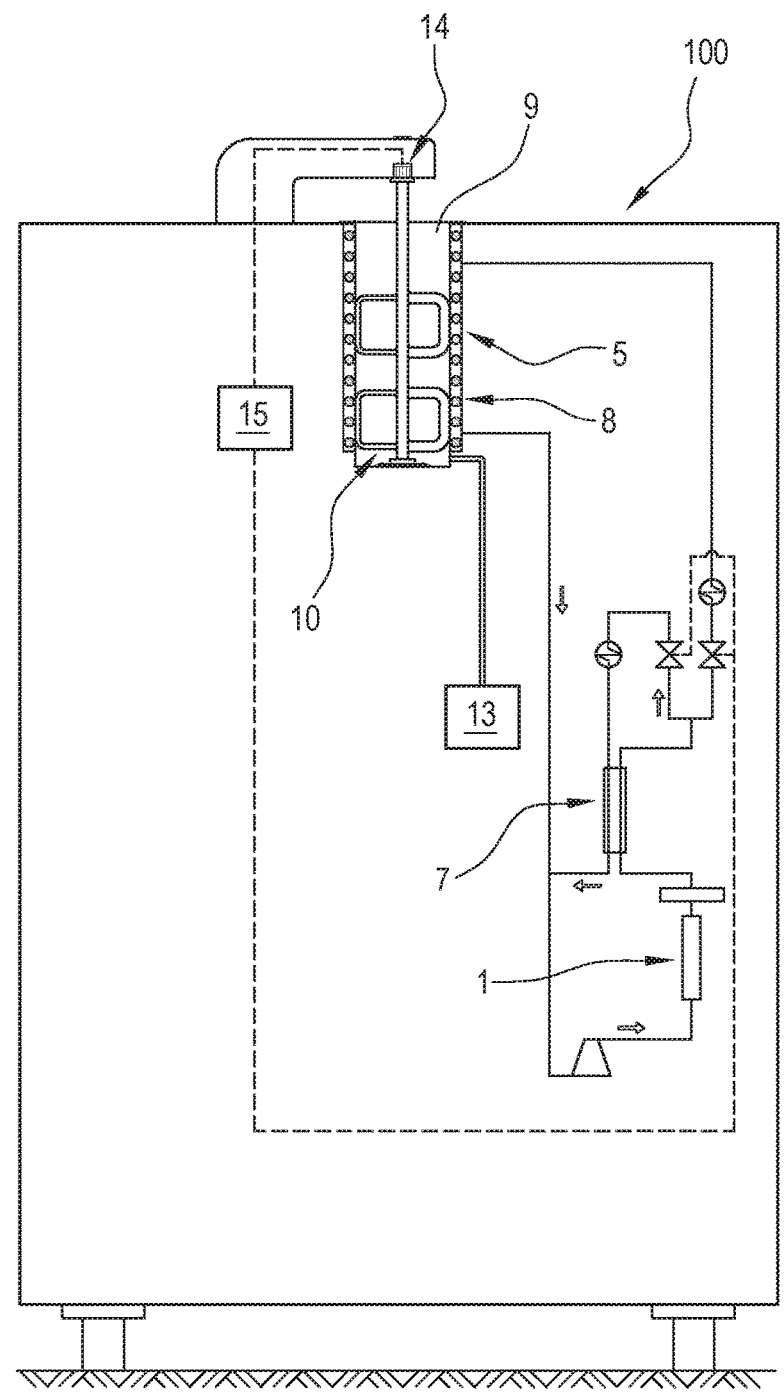
FIG. 5 is a schematic view of a different embodiment of a machine for making liquid and/or semi-liquid products comprising the thermodynamic system of this invention, illustrated in FIG. 3.

It should be noticed in particular that the machine schematically illustrated in FIG. 5 is an ice cream machine of the vertical-axis type.

What is claimed is:

1. A machine for making at least one chosen from a liquid and a semi-liquid food product, comprising:

a processing unit for making at least one chosen from a liquid and a semi-liquid food product, the processing unit comprising a processing container and a stirrer rotatably mounted inside the processing container, a thermal treatment system associated with the processing unit, the thermal treatment system comprising a circuit employing a heat exchanger fluid comprising:

a compressor including an inlet and an outlet;

a condenser, positioned at the outlet of the compressor;

at least one expansion element, positioned downstream of the condenser to allow the heat exchanger fluid to expand;

an evaporator, associable with the processing container and being positioned downstream of the at least one expansion element;

a liquid-suction exchanger including a delivery duct and a return duct, the delivery duct being connected on a first side to an outlet of the condenser to receive the heat exchanger fluid, and connectable on a second side to the at least one expansion element to release the heat exchanger fluid to the expansion element, and the return duct being connected, on a first side, to the inlet of the compressor;

a recirculation duct, connectable to the second side of the delivery duct to receive the heat exchanger fluid, and to a second side of the return duct, opposite the first side of the return duct, to release the heat exchanger fluid to the return duct;

a further expansion element positioned in the recirculation duct to allow the heat exchanger fluid circulating in the recirculation duct to expand;

wherein the evaporator is associated with the processing container to exchange heat with food product contained in the processing container.

2. The machine according to claim 1, comprising a brushless motor operatively coupled to the stirrer to drive the stirrer in rotation.

3. The machine according to claim 1, comprising a device for cleaning at least the processing unit.

4. The machine according to claim 1, wherein the machine is a machine for making ice cream and the processing unit is a mixing and cooling unit.

5. The machine according to claim 1, wherein the circuit comprises a storage tank configured to store a portion of the heat exchanger fluid.

6. The machine according to claim 1, wherein an outlet of the evaporator is connected to the recirculation duct, downstream of the further expansion element.

7. The machine according to claim 1, wherein an outlet of the evaporator is connected to a second side of the return duct, opposite to the first side, to release heat exchanger fluid to the return duct.

8. The machine according to claim 1, wherein an outlet of the evaporator is connected to the inlet of the compressor.

9. The machine according to claim 8, wherein the first side of the return duct is connected to the outlet of the evaporator.

10. The machine according to claim 1, wherein the circuit is implementable in a reversible cooling cycle, for cooling or heating the processing container.

* * * * *